US012217073B2

United States Patent
Zhang et al.

(10) Patent No.: US 12,217,073 B2
(45) Date of Patent: Feb. 4, 2025

(54) METHOD, AN APPARATUS, AN ELECTRONIC DEVICE, AND A STORAGE MEDIUM FOR DETECTING VIRTUAL MACHINE LOAD

(71) Applicant: Beijing Volcano Engine Technology Co., Ltd., Beijing (CN)

(72) Inventors: Yang Zhang, Beijing (CN); Zhimin Feng, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/677,805

(22) Filed: May 29, 2024

(65) Prior Publication Data

US 2024/0403090 A1    Dec. 5, 2024

(30) Foreign Application Priority Data

Jun. 1, 2023    (CN) .......................... 202310645315.0

(51) Int. Cl.
  *G06F 9/455*    (2018.01)
  *G06F 9/50*    (2006.01)
(52) U.S. Cl.
  CPC .......... *G06F 9/45533* (2013.01); *G06F 9/505* (2013.01)
(58) Field of Classification Search
  CPC .................................................. G06F 9/45538
  See application file for complete search history.

(56) References Cited

U.S. PATENT DOCUMENTS

2006/0064687 A1    3/2006    Dostert

FOREIGN PATENT DOCUMENTS

CN    115794302 A    3/2023

OTHER PUBLICATIONS

Chen et al., "XenHVMAcct Accurate CPU Time Accounting for Hardware-assisted Virtual Machine", Parallel and Distributed Computing, Applications and Technologies (PDCAT), 2010 International Conference on, IEEE, Dec. 8, 2010, 8 pages.
Extended European Search Report for European Patent Application No. 24180929.2, mailed on Nov. 15, 2024, 9 pages.

*Primary Examiner* — Charlie Sun
(74) *Attorney, Agent, or Firm* — Astute IP Law Group

(57)    ABSTRACT

Embodiments of the disclosure provide a method, an apparatus, an electronic device, and a storage medium for detecting virtual machine load. The method include: acquiring a virtual processor thread corresponding to a target virtual machine, wherein the virtual processor thread is an exclusive thread of the target virtual machine; acquiring a first occupation duration of the virtual processor thread in a guest mode within a first detection period, wherein the virtual processor thread in the guest mode is used for executing a task request of the target virtual machine, and the first occupation duration represents a duration in which the virtual processor thread is in a state of executing the task request of the target virtual machine; and obtaining a running load of the target virtual machine according to a proportion of the first occupation duration in the first detection period.

20 Claims, 7 Drawing Sheets

METHOD, AN APPARATUS, AN ELECTRONIC DEVICE, AND A STORAGE MEDIUM FOR DETECTING VIRTUAL MACHINE LOAD

CROSS-REFERENCE

The present application claims priority to Chinese Patent Application No. 202310645315.0, filed on Jun. 1, 2023 and entitled "A METHOD, AN APPARATUS, AN ELECTRONIC DEVICE, AND A STORAGE MEDIUM FOR DETECTING VIRTUAL MACHINE LOAD", the entirety of which is incorporated herein by reference.

FIELD

Embodiments of the present disclosure relate to the field of virtual machine technologies, and in particular, to a method, an apparatus, an electronic device, and a storage medium for detecting virtual machine load.

BACKGROUND

A virtual machine refers to a complete computer system having complete hardware system functions and running in a completely isolated environment and simulated by software. A cloud service manufacturer creates a virtual machine instance by means of a physical machine cluster, so as to provide a user with virtual machines having different computing capabilities.

The running load of a virtual machine is one of important indexes for managing and monitoring the virtual machine. In the prior art, the out-of-band detection for the virtual machine load is usually performed by detecting a halt instruction representing that the virtual machine enters an idle state, thus calculating the running load of the virtual machine.

However, for a virtual machine with exclusive thread, because a halt instruction cannot be obtained, a problem that out-of-band detection cannot be performed on a running load of the virtual machine is caused.

SUMMARY

Embodiments of the present disclosure provide a method, an apparatus, an electronic device, and a storage medium for detecting virtual machine load, so as to overcome a problem that out-of-band detection for virtual machine load cannot be implemented for a virtual machine with exclusive thread.

According to a first aspect, an embodiment of the present disclosure provides a method for detecting virtual machine load, including:

acquiring a virtual processor thread corresponding to a target virtual machine, wherein the virtual processor thread is an exclusive thread of the target virtual machine; acquiring a first occupation duration of the virtual processor thread in a guest mode within a first detection period, wherein the virtual processor thread in the guest mode is used for executing a task request of the target virtual machine, and the first occupation duration represents a duration in which the virtual processor thread is in a state of executing the task request of the target virtual machine; and obtaining a running load of the target virtual machine according to a proportion of the first occupation duration in the first detection period.

According to a second aspect, an embodiment of the present disclosure provides an apparatus for detecting virtual machine load, comprising:

an acquiring module configured to acquire a virtual processor thread corresponding to a target virtual machine, wherein the virtual processor thread is an exclusive thread of the target virtual machine;

a processing module configured to acquire a first occupation duration of the virtual processor thread in a guest mode within a first detection period, wherein the virtual processor thread in the guest mode is used for executing a task request of the target virtual machine, and the first occupation duration represents a duration in which the virtual processor thread is in a state of executing the task request of the target virtual machine; and a detecting module configured to obtain a running load of the target virtual machine according to a proportion of the first occupation duration in the first detection period.

According to a third aspect, an embodiment of the present disclosure provides an electronic device, comprising: a processor, and a memory communicatively connected with the processor;

the memory storing a computer execution instruction;

the processor executing the computer executable instruction stored in the memory, to implement the method for detecting virtual machine load of the first aspect and the various possible designs of the first aspect.

According to a fourth aspect, an embodiment of the present disclosure provides a computer readable storage medium, wherein the computer readable storage medium stores a computer execution instruction, and a processor, when executing the computer execution instruction, implements the method for detecting virtual machine load of the first aspect and the various possible designs of the first aspect is implemented.

According to a fifth aspect, an embodiment of the present disclosure provides a computer program product, comprising a computer program, the computer program, when executed by a processor, implementing the method for detecting virtual machine load of the first aspect and the various possible designs of the first aspect is implemented.

The embodiments of this disclosure provide a method, an apparatus, an electronic device and a storage medium for detecting virtual machine load. The solution comprises: acquiring a virtual processor thread corresponding to a target virtual machine, wherein the virtual processor thread is an exclusive thread of the target virtual machine; acquiring a first occupation duration of the virtual processor thread in a guest mode within a first detection period, wherein the virtual processor thread in the guest mode is used for executing a task request of the target virtual machine, and the first occupation duration represents a duration in which the virtual processor thread is in a state of executing the task request of the target virtual machine; and obtaining a running load of the target virtual machine according to a proportion of the first occupation duration in the first detection period. A first occupation duration of the virtual processor thread of the target virtual machine in a guest mode is acquired, then the running load of the target virtual machine is determined based on the proportion of the first occupation duration in the first detection period. Thus, the purpose of determining the running load of the virtual machine by the proportion of the occupied duration of the virtual processor thread in the guest mode is achieved. On the one hand, a problem that out-of-band detection for virtual machine load cannot be implemented for a virtual machine with exclusive thread is solved. On the other hand, because calculation is performed according to the first occupation duration corresponding to the guest mode, the time consumed by the resource overhead of the virtualization layer is eliminated. Therefore, the accuracy of load detection is also improved.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure. Other drawings may also be obtained by the skilled person in the art according to these drawings without creative efforts.

DETAILED DESCRIPTION

In order to make objects, technical solutions and advantages of the embodiments of the present disclosure more apparent, the technical solutions in the embodiments of the present disclosure will be described below in a clearly and fully understandable way in connection with the drawings related to the embodiments of the present disclosure. Obviously, the described embodiments are only a part but not all of the embodiments of the present disclosure. All other embodiments obtained by persons of ordinary skill in the art based on the embodiments of the present disclosure without creative efforts shall belong to the scope of protection of the present disclosure.

It should be noted that, the user information (including but not limited to user equipment information, user personal information, and the like) and data (including but not limited to data used for analysis, stored data, displayed data, and the like) involved in the present disclosure are information and data which are authorized by a user or sufficiently authorized by each party, and collection, use and processing of relevant data need to comply with relevant legal regulations and standards of relevant countries and regions, a corresponding operation entry is provided for the user to select authorization or rejection.

Figure 1:
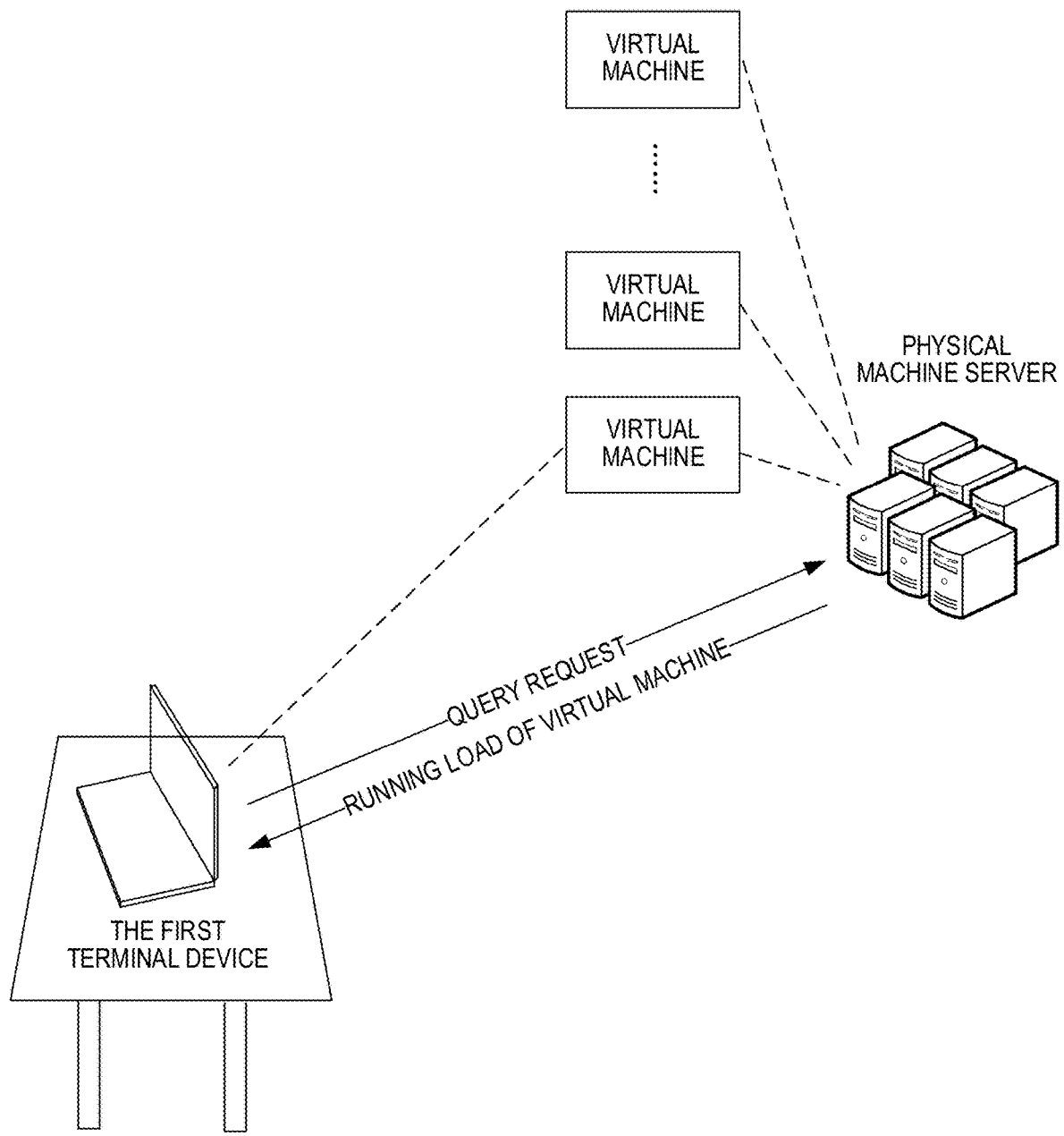
FIG. 1 is an application scenario diagram of a method for detecting virtual machine load according to an embodiment of the present disclosure.

Application scenarios of the embodiments of the present disclosure will be explained below:

FIG. 1 is an application scenario diagram of a method for detecting virtual machine load according to an embodiment of the present disclosure. The method for detecting virtual machine load according to the embodiment of the present disclosure may be applied to application scenarios such as virtual machine load management and virtual machine state query. Specifically, as shown in FIG. 1, the method provided in the embodiment of the present disclosure can be applied to a physical machine cluster corresponding to a virtual machine, which is hereinafter referred to as a physical machine server. A data processing unit (DPU) based on an X86 architecture is provided in the physical machine server, and has a network capability and a general-purpose computing capability, and can assist a central processing unit (CPU) to performs network load, and performs data detection and processing. Therefore, in other possible implementations, the method provided in the embodiment of the present disclosure may also be directly applied to a data processor. Taking a physical machine server configured with a data processor as an example, the physical machine server further configures a plurality of virtual machines by virtual machine management software. Each virtual machine is an instance created by the physical machine server through CPU, and corresponds to one or more threads in the physical machine server. Each thread is a virtual processor (VCPU) of the virtual machine. The exclusive virtual machine has exclusive threads provided by the physical machine server, that is, the threads are not shared with other virtual machines. On the user side, on the one hand, the user can log in to the authorized virtual machine through the terminal device, and configure and manage the virtual machine to make the virtual machine to realize corresponding functions, such as providing website services, application services, etc. On the other hand, the user may send a query request to the physical machine server to obtain the running load of the authorized virtual machine, that is, the out-of-band detection of the running load of the virtual machine. The physical machine server (or the data processor in the physical machine server) obtains the running load of the configured virtual machine through the method for detecting virtual machine load provided by the embodiment of the present disclosure, and enable the user to access the query interface provided by the physical machine server through a terminal device, thus to realize the out-of-band detection for virtual machine load.

In the prior art, as for out-of-band detection for virtual machine load, it is usually detect halt instruction (to realize the sharing of thread resources) at the virtualization layer of the physical machine server for the virtual machines with shared threads, wherein the halt instruction is used to make the virtual processor of the virtual machine enter an idle state. Then, the idle ratio of the virtual processor is calculated, thereby the calculation of the running load of the virtual machine is realized. However, for the virtual machines with exclusive threads, since it needs not to share thread resources, the virtualization layer no longer intercepts the halt instructions of the virtual machines, which leads to the problem that out-of-band detection of the running load of the virtual machines cannot be realized. The embodiments of the present disclosure provide a method for detecting virtual machine load to solve the above problems.

Figure 2:
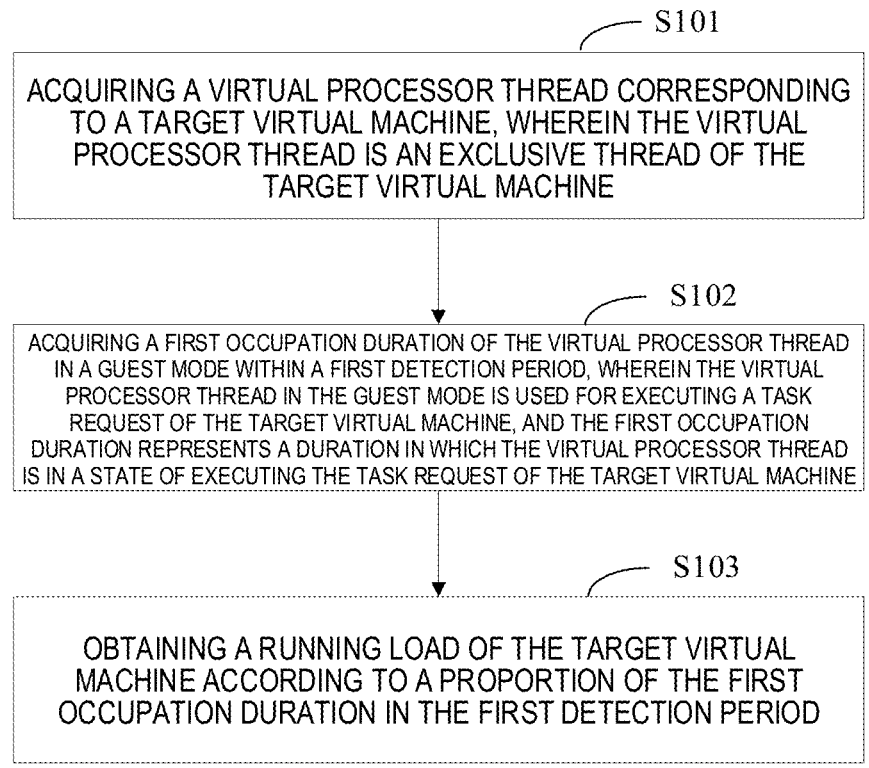
FIG. 2 is a first schematic flowchart of a method for detecting virtual machine load according to an embodiment of the present disclosure.

Referring to FIG. 2, FIG. 2 is a first schematic flowchart of a method for detecting virtual machine load according to an embodiment of the present disclosure. The method in this embodiment may be applied to a physical machine server. The method for detecting virtual machine load comprises:

Step S101: acquiring a virtual processor thread corresponding to a target virtual machine, wherein the virtual processor thread is an exclusive thread of the target virtual machine.

Exemplarily, with reference to a schematic diagram of an application scenario shown in FIG. 1, an execution subject of the method for detecting virtual machine load provided in an embodiment of the present disclosure may be a physical machine server. The physical machine server creates one or more virtual machine instances based on configuration information, including a target virtual machine used as a detected object in this embodiment. The virtual machine instance comprises one or more virtual processors, and the virtual processors are virtual processor threads provided by the physical machine server, i.e., the target virtual machine corresponds to one or more virtual processor threads. The solution provided in this embodiment is applicable to an exclusive virtual machine, that is, a virtual processor thread corresponding to a target virtual machine is an exclusive thread allocated to the target virtual machine by a physical machine server. Even in an idle state, the thread resource is not shared with other virtual machines.

Specifically, when a physical machine server needs to detect a running load of a target virtual machine, based on an identification identifier of the target virtual machine, one or more virtual processor threads corresponding to the target virtual machine may be obtained, wherein the identification identifier of the target virtual machine and the thread identifier of the virtual processor thread have a preset mapping relationship, which is generated when the target virtual machine is created, and will not be repeated herein.

Step S102: acquiring a first occupation duration of the virtual processor thread in a guest mode within a first detection period, wherein the virtual processor thread in the guest mode is used for executing a task request of the target virtual machine, and the first occupation duration represents a duration in which the virtual processor thread is in a state of executing the task request of the target virtual machine.

Exemplarily, after a virtual processor thread corresponding to a target virtual machine is located, cyclic detection is performed on the virtual processor thread based on a fixed detection period, so as to achieve continuous real-time detection of a running load of the target virtual machine. More specifically, the detection period is, for example, 1 second, 10 seconds, and so on, that is, the virtual processor thread is detected by using 1 second or 10 seconds as the detection period. The same detection steps are executed in each detection period. The above described first detection period is a detection period for detecting a virtual processor thread.

Further, based on the implementation principle of the virtual machine, the virtual processor threads are alternatively in two states, i.e., a guest mode (GUEST) and a host mode (HOST). The two modes are mainly used to isolate an operation permission and ensure the running security of a physical machine server. Therefore, the virtual processor threads have different operation permission in different modes, and complete corresponding function using a corresponding operation permission. When entering guest mode, the virtual processor thread executes the task requests of the target virtual machine, and more specifically, executes the codes and instructions of the virtual machine system of the target virtual machine. When entering the host mode, the virtual processor thread executes the task requests of the physical machine, i.e., the codes and instructions of the physical machine system. By means of the switching between the host mode and the guest mode, the permission isolation is realized, and the operation security of the physical machine is ensured. The specific implementations of the host mode and the guest mode are the prior art, and are not repeated herein.

Further, after entering an access mode, the virtual processor thread may be in one of two possible states, i.e., an idle state or a running state. When the virtual processor thread is in a state of executing a task request of a target virtual machine, the virtual processor thread is in a running state. On the contrary, when the virtual processor thread is in a state of not executing the task request of the target virtual machine, the virtual processor thread is in an idle state. According to a specific task request of a target virtual machine, a virtual processor thread continuously stays or witches between two states, until a mode switching condition is triggered. For example, when a task request of a target virtual machine needs to invoke internal function of a physical machine to implement, the virtual processor thread exits the guest mode and enters a host mode with better permission, and executes a task request of a corresponding physical machine, so as to realize corresponding functions. In this process, the total duration in which the virtual processor thread is in a running state in the guest mode is the first occupation duration. In the steps of this embodiment, the first occupation duration in a guest mode is counted, and then a running load of a target virtual machine is obtained by using the first occupation duration. The time consumption caused when an instruction of a virtualization layer is executed in a host mode is excluded, and therefore, a finally obtained running load of a target virtual machine can truly reflect a real load at the side of the target virtual machine, and the accuracy of load detection is improved.

Figure 3:
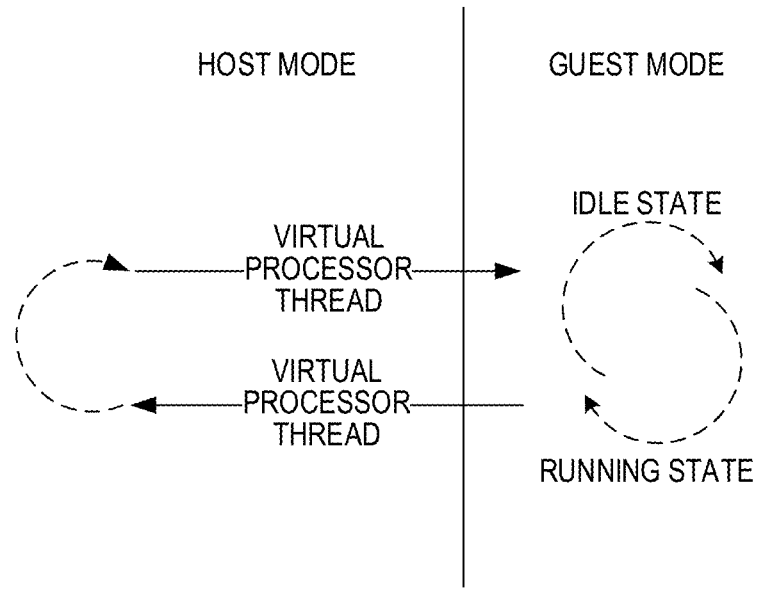
FIG. 3 is a schematic diagram of an execution process of a virtual processor thread according to an embodiment of the present disclosure.

FIG. 3 is a schematic diagram of an execution process of a virtual processor thread provided in an embodiment of the present disclosure. As shown in FIG. 3, after a virtual processor thread enters a guest mode from a host mode, the virtual processor thread continuously stays or switches in an idle state and a running state, and the virtual processor thread records an accumulated stay time in each state. The virtual processor thread then exits the guest mode, enters the host mode to execute task requests of the physical machine, and thereafter enters the guest mode again, the above process cycles. In the foregoing cycling process, the accumulated stay time that is recorded by the virtual processor thread in each state is accumulated all the time until the end of the first detection period. Then the first occupation duration is obtained according to the accumulated duration in the running state that is recorded by the virtual processor thread, that is, the duration in which the virtual processor thread is in the state of executing the task request of the target virtual machine.

Figure 4:
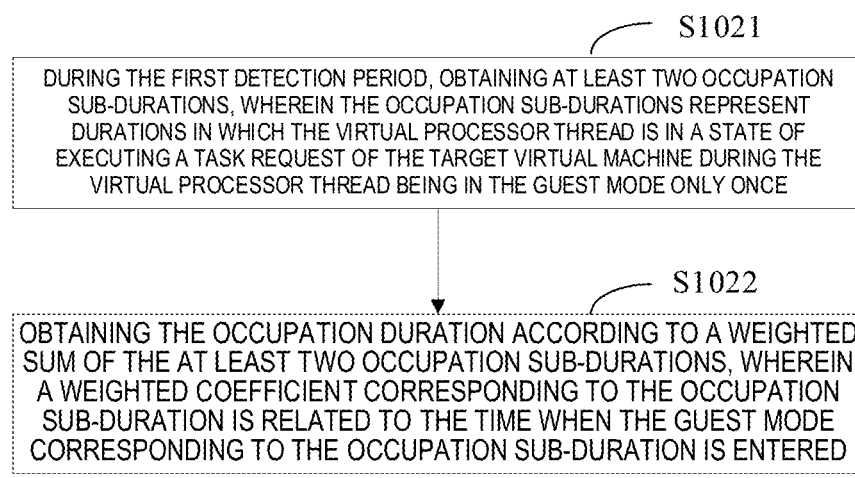
FIG. 4 is a flowchart of a specific implementation of step S102 in the embodiment shown in FIG. 2.

In a possible implementation, as shown in FIG. 4, a specific implementation of step S102 includes:

Step S1021: during the first detection period, obtaining at least two occupation sub-durations, wherein the occupation sub-durations represent durations in which the virtual processor thread is in a state of executing a task request of the target virtual machine during the virtual processor thread being in the guest mode only once.

Step S1022: obtaining the occupation duration according to a weighted sum of at least two occupation sub-durations, wherein a weighted coefficient corresponding to the occupation sub-duration is related to the time when the guest mode corresponding to the occupation sub-duration is entered.

Figure 5:
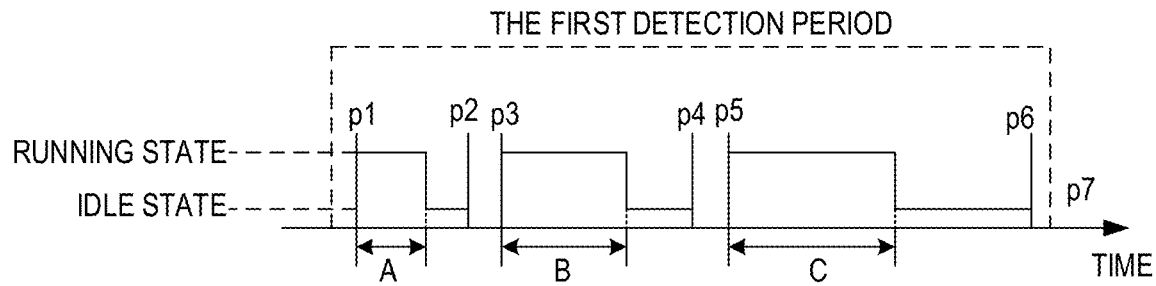
FIG. 5 is a schematic diagram of an occupied sub-duration according to an embodiment of the present disclosure.

Exemplarily, with reference to a schematic diagram of an execution process of a virtual processor thread shown in FIG. 3, during the first detection period, after the virtual processor thread enters a guest mode each time, the accumulated duration in which the virtual processor thread stays in a running state is the occupation sub-duration. After multiple cycles of entering the guest mode and exiting the guest mode, multiple occupation sub-durations are obtained, and are summed to obtain the total occupation duration. The weighted coefficient corresponding to the occupation sub-duration is related to the time when the guest mode corresponding to the occupation sub-duration is entered. In other word, the closer the time when the guest mode corresponding to the occupation sub-duration is entered is to the current time, the larger the weighted coefficient is. On the contrary, the longer the time when the guest mode corresponding to the occupation sub-duration is entered is from the current time, the smaller the weight coefficient is. FIG. 5 is a schematic diagram of an occupation sub-duration according to an embodiment of the present disclosure. As shown in FIG. 5, during the first detection period, as the virtual processor thread enters guest mode multiple times, multiple occupation sub-durations are obtained. As can be seen, the virtual processor thread enters guest mode for the first time at p1, exits the guest mode at p2 and enters the host mode. During this process of entering the guest mode, the duration of being in the running mode is accumulated to be A seconds, that is, a occupation sub-duration A (shown as A in the figure) is obtained. Similarly, the virtual processor thread enters the guest mode for the first time at p3, exits the guest mode at p4, accordingly an occupation sub-duration B (shown as B in the figure) is obtained. The virtual processor thread enters the guest mode for the first time at p5, exits the guest mode at p6, accordingly an occupation sub-duration C (shown as C in the figure) is obtained. After that, the first detection period ends at the time p7. Based on the distances between the starting points (p1, p3, p5) or ending points (p2, p3, p6) of the virtual processor threads entering the guest mode each time and the time p7, the corresponding weight coefficients are obtained. For example, as shown in the figure, the weight coefficient corresponding to the occupation sub-duration A is 0.2, the weight coefficient corresponding to the occupation sub-duration B is 0.3, and the weight coefficient corresponding to the occupation sub-duration C is 0.5. Finally, weighted sum is performed on the occupation sub-duration A, the occupation sub-duration B, and occupation sub-duration C to obtain a first occupation duration=0.2A+0.3B+0.5C. The specific method for determining the weighting coefficient may be realized on the basis of the time distance in an inverse proportion relationship with the weighting coefficient, and a specific calculation method may be set according to needs, which is not limited herein. The time distance is the distance between the time of entering the guest mode or the time of exiting the guest mode and the current time.

In this embodiment, the occupation sub-durations corresponding to multiple times of entering the guest mode are calculated, and the weighted calculation are performed on the time distances corresponding to the occupation sub-durations. Thus, the weight of the occupation sub-duration close to the current time can be increased, thereby improving the realtime performance and accuracy of the running load obtained based on the occupation duration.

Step S103: obtaining a running load of the target virtual machine according to a proportion of the first occupation duration in the first detection period.

Exemplarily, after obtaining the first occupation duration indicating the total accumulated duration in which the virtual processor thread is in the running state, a proportion of the virtual processor thread of the target virtual machine in the running state, that is, the occupation rate of the virtual processor of the target virtual machine, may be obtained according to the proportion of the first occupation duration in the first detection period. For example, the first detection period is 2 seconds, then the first actual occupation duration obtained by dividing the first occupation duration by the reference frequency of the virtual processor thread is 1 second. That is, the occupation rate of the virtual processor thread is ½, i.e., 50%.

In addition, based on the occupation rate of the virtual processor of the target processor, the running load of the target virtual machine can be obtained. Further, when the target virtual machine has a plurality of virtual processors, the occupation rates respectively corresponding to various virtual processors may be obtained by the described steps. After that, the occupation rate of each virtual processor may be further processed, for example, an average occupation rate of a plurality of virtual machine processors is calculated, or, the maximum occupation rate of the plurality of virtual machine processors is selected, thus the running load of the target virtual machine may be calculated.

Further, in a possible implementation, the occupation rate of the virtual processor of the target virtual machine may be directly used as the running load of the target virtual machine. In another possible implementation, based on the occupation rate of the virtual processor of the target virtual machine, weighted calculation may be further performed in combination with other resources, for example, memory occupation resource, network bandwidth resource, and the like, so as to obtain a running load of the target virtual machine, which may be set according to a requirement, and details are not repeated herein.

In this embodiment, acquiring a virtual processor thread corresponding to a target virtual machine, wherein the virtual processor thread is an exclusive thread of the target virtual machine; acquiring a first occupation duration of the virtual processor thread in a guest mode within a first detection period, wherein the virtual processor thread in the guest mode is used for executing a task request of the target virtual machine, and the first occupation duration represents a duration in which the virtual processor thread is in a state of executing the task request of the target virtual machine; obtaining a running load of the target virtual machine according to a proportion of the first occupation duration in the first detection period. A first occupation duration of the virtual processor thread of the target virtual machine in a guest mode is acquired, then the running load of the target virtual machine is determined based on the proportion of the first occupation duration in the first detection period. Thus, the purpose of determining the running load of the virtual machine by the proportion of the occupied duration of the virtual processor thread in the guest mode is achieved. On the one hand, a problem that out-of-band detection for virtual machine load cannot be implemented for a virtual machine with exclusive thread is solved. On the other hand, because calculation is performed according to the first occupation duration corresponding to the guest mode, the time consumed by the resource overhead of the virtualization layer is eliminated. Therefore, the accuracy of load detection is also improved.

Figure 6:
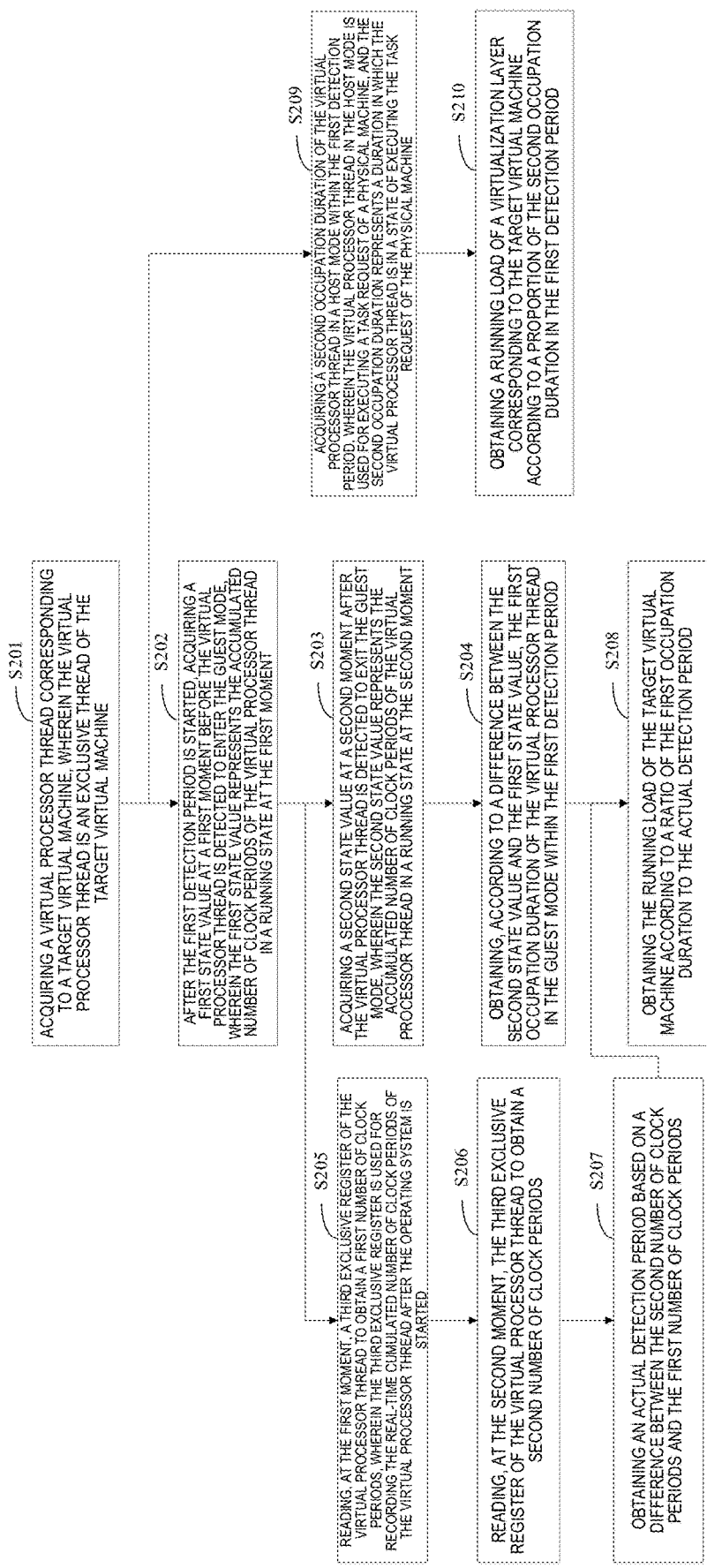
FIG. 6 is a second schematic flowchart of a method for detecting virtual machine load according to an embodiment of the present disclosure.

Referring to FIG. 6, FIG. 6 is a second schematic flowchart of a method for detecting virtual machine load according to an embodiment of the present disclosure. In this embodiment, on the basis of the embodiment shown in FIG. 2, step S102 is further refined, and the method for detecting virtual machine load comprises:

Step S201: acquiring a virtual processor thread corresponding to a target virtual machine, wherein the virtual processor thread is an exclusive thread of the target virtual machine.

Step S202: after the first detection period is started, acquiring a first state value at a first moment before the virtual processor thread is detected to enter the guest mode, wherein the first state value represents the accumulated number of clock periods of the virtual processor thread in a running state at the first moment.

Step S203: acquiring a second state value at a second moment after the virtual processor thread is detected to exit the guest mode, wherein the second state value represents the accumulated number of clock periods of the virtual processor thread in a running state at the second moment.

Exemplarily, after the first detection period is started, at a first moment before the virtual processor thread enters the guest mode, acquiring a count value, i.e., a first state value, which represents the accumulated number of clock periods of the virtual processor thread in a running state at present (the first moment). The first state value may exist in a register corresponding to the virtual processor thread. The first state value may be obtained by reading the register. Correspondingly, at a second moment after the virtual processor thread is detected to exit the guest mode, by reading the content in the same register, a count value, i.e., a second state value, is acquired, which represents the accumulated number of clock periods of the virtual processor thread in the running state at present (the second moment). The first state value and the second state value may also be obtained in other manners in addition to the foregoing manners of reading a register., for example, accessing a pre-running timing service, a program, and the like, which is not specifically limited herein.

More specifically, exemplarily, the method provided by this embodiment may be performed on a CPU platform based on an X86 architecture, that is, a physical machine provides a virtual machine with virtual processor threads by CPU of the X86 architecture. In this application scenario, exemplarily, the specific implementation of step S202 comprises: in response to a first instruction for entering the guest mode is detected, reading a first exclusive register of the virtual processor thread to obtain the first state value, wherein the first exclusive register is used for recording the real-time accumulated number of clock periods of the virtual processor thread in the running state after an operating system is started. Accordingly, the specific implementation of step S203 comprises: in response to a second instruction for exiting the guest mode is detected, reading the first exclusive register of the virtual processor thread to obtain the second state value.

For example, a CPU based on the X86 architecture provides some registers (MSRs) whose columns are exclusively occupied by the CPU core (per-cpu), i.e., exclusive registers. The first exclusive register in this embodiment is an MSR_IA32_MPERF register. The register may record an accumulated total duration in which a virtual processor thread (CPU core) is in a C0 state (i.e., a running state) since the start of an operating system. The accumulated total duration is represented by the number of clock cycles, that is, the accumulated total duration is divided by a reference frequency of the CPU core to obtain a corresponding actual running duration.

Figure 7:
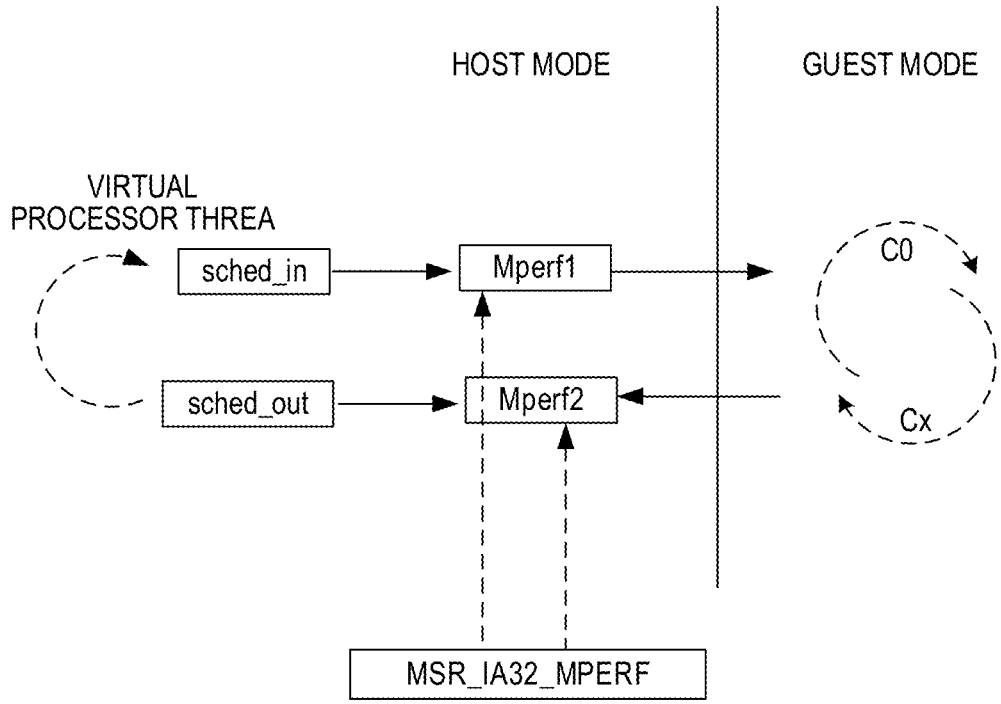
FIG. 7 is a schematic diagram of a process for acquiring a first state value and a second state value according to an embodiment of the present disclosure.

FIG. 7 is a schematic diagram of a process for acquiring a first state value and a second state value according to an embodiment of the present disclosure. As shown in FIG. 7, upon detecting a first instruction (shown as scheduled in) to enter guest mode, the MSR_IA32_MPERF register of the virtual processor thread is read, a corresponding first state value (shown as Mperf1) is obtained. Then the virtual processor thread enters a guest mode, and performs a task request of a target virtual machine, and correspondingly is in a running state (shown as C0) or an idle state (shown as Cx). Later, when a second instruction (shown as scheduled_out) to exit guest mode is detected, the MSR_IA32_MPERF register of the virtual processor thread is read again, a corresponding second state value (shown as Mperf2) is obtained.

Step S204: obtaining, according to a difference between the second state value and the first state value, the first occupation duration of the virtual processor thread in the guest mode within the first detection period.

Exemplarily, after the second state value and the first state value are obtained, based on a difference between the second state value and the first state value, the first occupation duration of the virtual processor thread in the guest mode may be obtained when the virtual processor thread is in the guest mode once, that is, the occupation sub-duration in the embodiment shown in FIG. 4. If more than one occupation sub-durations are obtained in the first detection period, that is, if the virtual processor thread is in the guest mode many times, the corresponding occupation sub-durations are obtained based on the difference between the second state value and the first state value each time the virtual processor thread exits the guest mode. Then, the corresponding occupation sub-durations are added to obtain the first occupation duration of the virtual processor thread in the guest mode within a first detection period.

Figure 8:
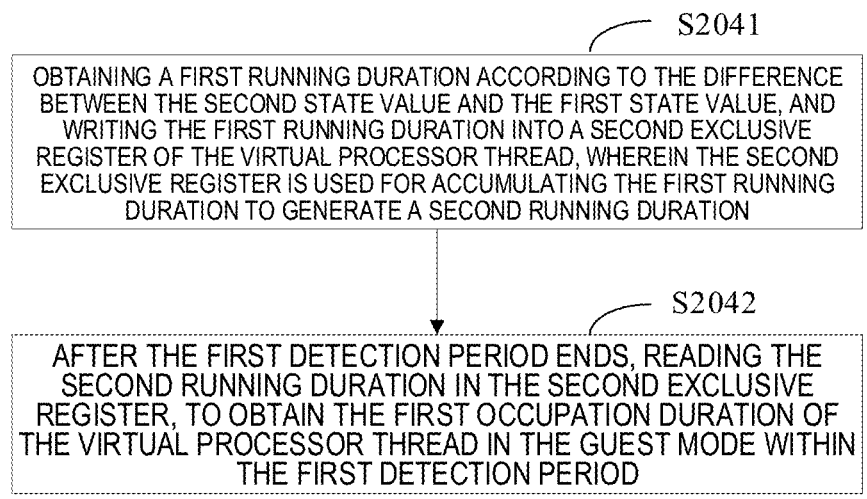
FIG. 8 is a flowchart of a specific implementation of step S204 in the embodiment shown in FIG. 6.

In a possible implementation, as shown in FIG. 8, exemplarily, the specific implementation of step S204 includes:

Step S2041: obtaining a first running duration according to a difference between the second state value and the first state value, and writing the first running duration into a second exclusive register of the virtual processor thread, wherein the second exclusive register is used for accumulating the first running duration to generate a second running duration.

Step S2042: after the first detection period ends, reading the second running duration in the second exclusive register, so as to obtain the first occupation duration of the virtual processor thread in the guest mode within the first detection period.

Exemplarily, after the virtual processor thread exits the access mode each time and obtains a second state value, a difference is made between the second state value and a first state value obtained when the virtual processor thread enters the access mode each time, to obtain a first running duration, that is, a occupation sub-duration, and the first running duration is written into a second exclusive register of the virtual processor thread. The second exclusive register is used for accumulating the first running duration, so as to generate a second running duration after the first detection period ends. Specifically, for example, after the virtual processor thread exits the guest mode for the first time, a difference between the second state value and the first state value is calculated to obtain a first running duration t1, then the first running duration t1 is written into the second exclusive register to be accumulated, and at this time, the second running duration in the second exclusive register=t1. Similarly, after the virtual processor thread exits the guest mode for the second time, the difference between the second state value and the first state value is calculated to obtain a first running duration t2, and the running duration t2 is written into the second exclusive register to be accumulated, and at this time, the second running duration in the second exclusive register=t1+t2. The foregoing steps are executed cyclically until the first detection period ends, and a second running duration, for example, t1+t2+ . . . +tn, in the second exclusive register is read as the first occupation duration of the virtual processor thread in the guest mode within the first detection period.

Optionally, the method provided in this embodiment further comprises:

Step S205: reading, at the first moment, a third exclusive register of the virtual processor thread to obtain a first number of clock periods, wherein the third exclusive register is used for recording the real-time cumulated number of clock periods of the virtual processor thread after the operating system is started.

Step S206: reading, at the second moment, the third exclusive register of the virtual processor thread to obtain a second number of clock periods.

Step S207: obtaining an actual detection period based on a difference between the second number of clock periods and the first number of clock periods.

For example, after the first detection period is started, at the first moment before the virtual processor thread enters the guest mode, in addition to the first state value that represents the accumulated numbers of clock periods of the virtual processor thread in the running state at the first moment, a third exclusive register of a virtual processor thread is read at the same time to obtain a first number of clock periods, wherein the third exclusive register is used for recording the real-time cumulated number of clock periods of the virtual processor thread after the operating system is started. Specifically, the third exclusive register is a time stamp counter, and records the cumulated number of clock periods consumed since the virtual processor thread (CPU core) is started. Therefore, the obtained first number of clock periods represents a time stamp of the virtual processor thread at the current moment (the first moment). Similarly, at a second moment after the virtual processor thread exits the guest mode, a third exclusive register of the virtual processor thread is read to obtain a second number of clock periods, which represents another time stamp of the virtual processor thread at the current moment (the second moment). After that, the actual consumption duration of the virtual processor thread in the guest mode is obtained, based on a difference between the second number of clock period and the second number of clock period. Further, in the case that the virtual processor thread enters and exits the access mode multiple times within the first detection period, each time the access mode is exited, an actual consumption duration may be obtained, and the actual consumption durations obtained after each time the access mode being exited are added, a total detection duration, that is, an actual detection period, for the visitor mode can be obtained.

Step S208: obtaining the running load of the target virtual machine according to a ratio of the first occupation duration to the actual detection period.

After the first occupation duration and the actual detection period are obtained, a running load of the target virtual machine may be obtained based on a ratio of the first occupation duration to the actual detection period. The specific implementation is similar to the implementation process of step S103 in the embodiment shown in FIG. 2, and is not repeated herein. It should be noted that, the actual detection period is represented based on the number of clock period, and is represented in the same manner as the first occupation duration. Therefore, a ratio of the first occupation duration to the actual detection period may be directly calculated to obtain the running load of the target virtual machine.

In this embodiment, the actual detection period is obtained by synchronously reading the third exclusive register at the first moment and the second moment. In addition, the actual running load of the target virtual machine is calculated based on a ratio of the first occupation duration to the actual detection period, Compared with the manner of directly using the first occupation duration and the duration of the first detection period to perform calculation, the influence of the time consumption of the virtualization layer on the total detection duration is excluded, and therefore the accuracy of providing the running load can be further provided.

Optionally, the method provided in this embodiment further includes:

Step S209: acquiring a second occupation duration of the virtual processor thread in a host mode within the first detection period, wherein the virtual processor thread in the host mode is used for executing a task request of a physical machine, and the second occupation duration represents a duration in which the virtual processor thread is in a state of executing the task request of the physical machine.

Exemplarily, in this embodiment, within the first detection period, while the running load of the target virtual machine is calculated by detecting the first occupation duration of the virtual processor thread in the guest mode, a second occupation duration of the virtual processor thread in the host mode is simultaneously detected, that is, a duration of the virtual processor thread in a state of executing the task request of the physical machine. In this way, the running load of the virtualization layer on the physical machine side is detected.

Figure 9:
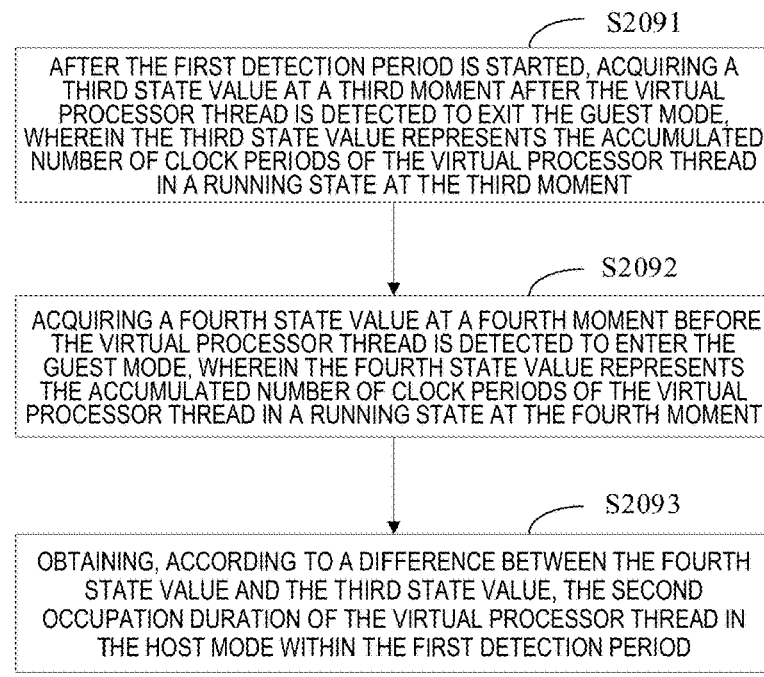
FIG. 9 is a flowchart of a specific implementation of step S206 in the embodiment shown in FIG. 6.

Exemplarily, as shown in FIG. 9, a specific implementation of step S209 includes:

Step S2091: after the first detection period is started, acquiring a third state value at a third moment after the virtual processor thread is detected to exit the guest mode, wherein the third state value represents the accumulated number of clock periods of the virtual processor thread in a running state at the first moment.

Step S2092: acquiring a fourth state value at a fourth moment before the virtual processor thread is detected to enter the guest mode, wherein the fourth state value represents the accumulated number of clock periods of the virtual processor thread in a running state at the fourth moment.

Step S2093: obtaining, according to a difference between the fourth state value and the third state value, the second occupation duration of the virtual processor thread in the host mode within the first detection period.

Exemplarily, referring to a schematic diagram of a process for acquiring the first state value and the second state value as shown in FIG. 7, at a third moment after the virtual processor thread is detected to exit the guest mode, the third state value is acquired, which represents the accumulated number of clock periods of the virtual processor thread in a running state at the third moment. The third moment may be the same as the second moment in the corresponding embodiment in FIG. 7, and the method for acquiring the third state value may be the same as the method for acquiring the second state value (reading the first exclusive register). Thus, the third state value may be the same as the second state value. After that, when the first instruction is detected next time, that is, at a fourth moment before the virtual processor thread is detected to enter the guest mode, a fourth state value is obtained, and the method for obtaining the fourth state value is the same as that for obtaining the first state value (reading the first exclusive register), and is not repeated herein. Then, the fourth state value is subtracted from the third state value to obtain a second occupation duration of the virtual processor thread in the host mode within the first detection period, wherein the second occupation duration is a running duration consumed by the virtual processor thread in the virtualization layer of the physical machine.

Step S210: obtaining a running load of a virtualization layer corresponding to the target virtual machine according to a proportion of the second occupation duration in the first detection period.

Exemplarily, afterwards, a proportion of the second occupation duration in the first detection period is calculated, so as to obtain a running load of a virtualization layer corresponding to the target virtual machine. The specific implementation thereof is similar to the process of calculating the running load of the target virtual machine in step S103, which is not repeated herein. It should be noted that, for the foregoing method for calculating the second occupation duration, reference may be made to the method for calculating the first occupation duration in the foregoing steps S202 to S204, and is not repeated herein.

In this embodiment, a running load of a virtualization layer corresponding to a target virtual machine is obtained by calculating a ratio of a second occupation duration to a first detection period, so that calculation of a running load of a virtual machine layer located in the physical machine side corresponding to the target virtual machine is implemented. Therefore, a more dimensional virtual machine running load query function is realized, and efficiency of management and configuration on the virtual machine is improved.

In this embodiment, the implementation of step S201 is the same as the implementation of step S101 in the embodiment shown in FIG. 2 of the present disclosure, which is not repeated herein.

Figure 10:
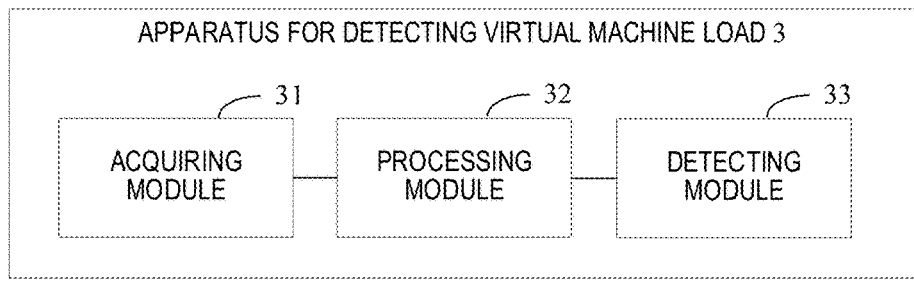
FIG. 10 is a structural block diagram of an apparatus for detecting virtual machine load according to an embodiment of the present disclosure.

Corresponding to the method for detecting virtual machine load in the foregoing embodiments, FIG. 10 is a structural block diagram of an apparatus for detecting virtual machine load according to an embodiment of the present disclosure. For ease of description, only parts related to the embodiments of the present disclosure are shown. Referring to FIG. 10, the apparatus 3 for detecting virtual machine load comprises:

an acquiring module 31 configured to acquire a virtual processor thread corresponding to a target virtual machine, wherein the virtual processor thread is an exclusive thread of the target virtual machine;

a processing module 32 configured to acquire a first occupation duration of the virtual processor thread in a guest mode within a first detection period, wherein the virtual processor thread in the guest mode is used for executing a task request of the target virtual machine, and the first occupation duration represents a duration in which the virtual processor thread is in a state of executing the task request of the target virtual machine;

a detecting module 33 configured to obtain a running load of the target virtual machine according to a proportion of the first occupation duration in the first detection period.

In one embodiment of the present disclosure, the processing module 32 is specifically used for: after the first detection period is started, acquiring a first state value at a first moment before the virtual processor thread is detected to enter the guest mode, wherein the first state value represents the accumulated number of clock periods of the virtual processor thread in a running state at the first moment; acquiring a second state value at a second moment after the virtual processor thread is detected to exit the guest mode, wherein the second state value represents the accumulated number of clock periods of the virtual processor thread in a running state at the second moment; obtaining, according to a difference between the second state value and the first state value, the first occupation duration of the virtual processor thread in the guest mode within the first detection period.

In one embodiment of the present disclosure, when acquiring a first state value at a first moment before the virtual processor thread is detected to enter the guest mode, the processing module 32 is specifically used for: in response to a first instruction for entering the guest mode is detected, reading a first exclusive register of the virtual processor thread to obtain the first state value, wherein the first exclusive register is used for recording the real-time accumulated number of clock periods of the virtual processor thread in the running state after an operating system is started; in response to acquiring a second state value at a second moment after the virtual processor thread is detected to exit the guest mode, the processing module 32 is specifically used for: when a second instruction for exiting the guest mode is detected, reading the first exclusive register of the virtual processor thread to obtain the second state value.

In one embodiment of the present disclosure, the first exclusive register is an MSR_IA32_MPERF register.

In one embodiment of the present disclosure, when obtaining, according to the difference between the second state value and the first state value, the first occupation duration of the virtual processor thread in the guest mode within the first detection period, the processing module 32 is specifically used for: obtaining a first running duration according to a difference between the second state value and the first state value, and writing the first running duration into a second exclusive register of the virtual processor thread, wherein the second exclusive register is used for accumulating the first running duration to generate a second running duration; after the first detection period ends, reading the second running duration in the second exclusive register, so as to obtain the first occupation duration of the virtual processor thread in the guest mode within the first detection period.

In one embodiment of the present disclosure, the processing module 32 is used for: reading, at the first moment, a third exclusive register of the virtual processor thread to obtain a first number of clock periods, wherein the third exclusive register is used for recording the real-time cumulated number of clock periods of the virtual processor thread after the operating system is started; reading, at the second moment, the third exclusive register of the virtual processor thread to obtain a second number of clock periods; obtaining an actual detection period based on a difference between the second number of clock periods and the first number of clock periods; a detecting module 33, is specifically used for: obtaining the running load of the target virtual machine according to a ratio of the first occupation duration to the actual detection period.

In one embodiment of the present disclosure, the processing module 32 is specifically used for: during the first detection period, obtaining at least two occupation sub-durations, wherein the occupation sub-durations represent durations in which the virtual processor thread is in a state of executing a task request of the target virtual machine during the virtual processor thread being in the guest mode only once; obtaining the occupation duration according to a weighted sum of at least two occupation sub-durations, wherein a weighted coefficient corresponding to the occupation sub-duration is related to the time when the guest mode corresponding to the occupation sub-duration is entered.

In one embodiment of the present disclosure, the processing modules 32 is used for: acquiring a second occupation duration of the virtual processor thread in a host mode within the first detection period, wherein the virtual processor thread in the host mode is used for executing a task request of a physical machine, and the second occupation duration represents a duration in which the virtual processor thread is in a state of executing the task request of the physical machine; a detecting module 33, is used for: obtaining a running load of a virtualization layer corresponding to the target virtual machine according to a proportion of the second occupation duration in the first detection period.

In one embodiment of the present disclosure, when acquiring a second occupation duration of the virtual processor thread in the host mode within the first detection period, the processing module 32 is specifically used for: after the first detection period is started, acquiring a third state value at a third moment after the virtual processor thread is detected to exit the guest mode, wherein the third state value represents the accumulated number of clock periods of the virtual processor thread in a running state at the third moment; acquiring a fourth state value at a fourth moment before the virtual processor thread is detected to enter the guest mode, wherein the fourth state value represents the accumulated number of clock periods of the virtual processor thread in a running state at the fourth moment; and obtaining, according to a difference between the fourth state value and the third state value, the second occupation duration of the virtual processor thread in the host mode within the first detection period.

The obtaining module 31, the processing module 32, and the detecting module 33 are connected in sequence. The apparatus 3 for detecting virtual machine load provided in this embodiment may execute the technical solutions of the foregoing method embodiments. The implementation principle and technical effect are similar, and are not repeated in this embodiment.

Figure 11:
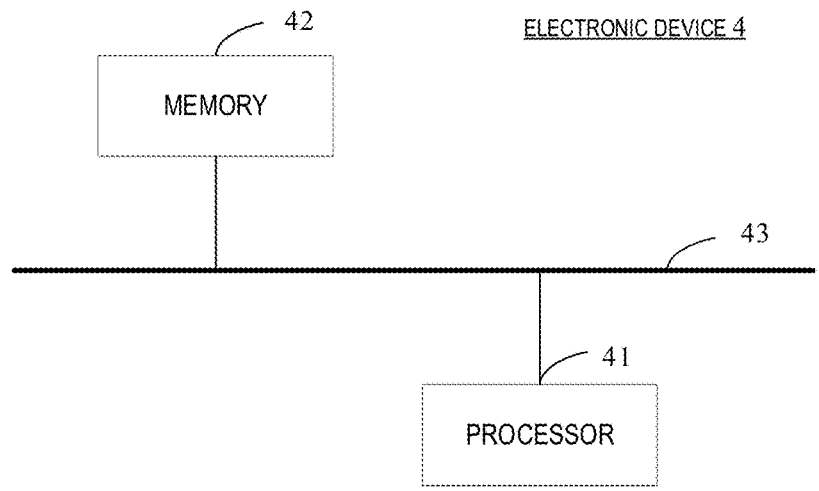
FIG. 11 is a structural schematic diagram of an electronic device according to an embodiment of the present disclosure.

FIG. 11 is a schematic structural diagram of an electronic device according to an embodiment of the present disclosure. As shown in FIG. 11, the electronic device 4 comprises:

a processor 41, and a memory 42 communicatively connected with the processor 41;
the memory 42 stores a computer execution instruction;
The processor 41 executes the computer execution instruction stored in the memory 42, to implement the method for detecting virtual machine load in the embodiments shown in FIG. 2 to FIG. 9.

Optionally, the processor 41 and the memory 42 are connected by using a bus 43.

The related descriptions may be understood with reference to the related descriptions and effects corresponding to the steps in the embodiments corresponding to FIG. 2 to FIG. 9, and will not be repeated herein.

Embodiments of the present disclosure provide a computer readable storage medium. The computer readable storage medium stores a computer execution instruction. When the computer execution instruction is executed by a processor, the computer execution instruction is used to implement a method for detecting virtual machine load provided in any embodiment of embodiments corresponding to FIGS. 2 to 9 of the present disclosure.

Embodiments of the present disclosure provide a computer program product, comprising a computer program. The computer program, when executed by a processor, implementing a method for detecting virtual machine load in the embodiments shown in FIG. 2 to FIG. 9.

Figure 12:
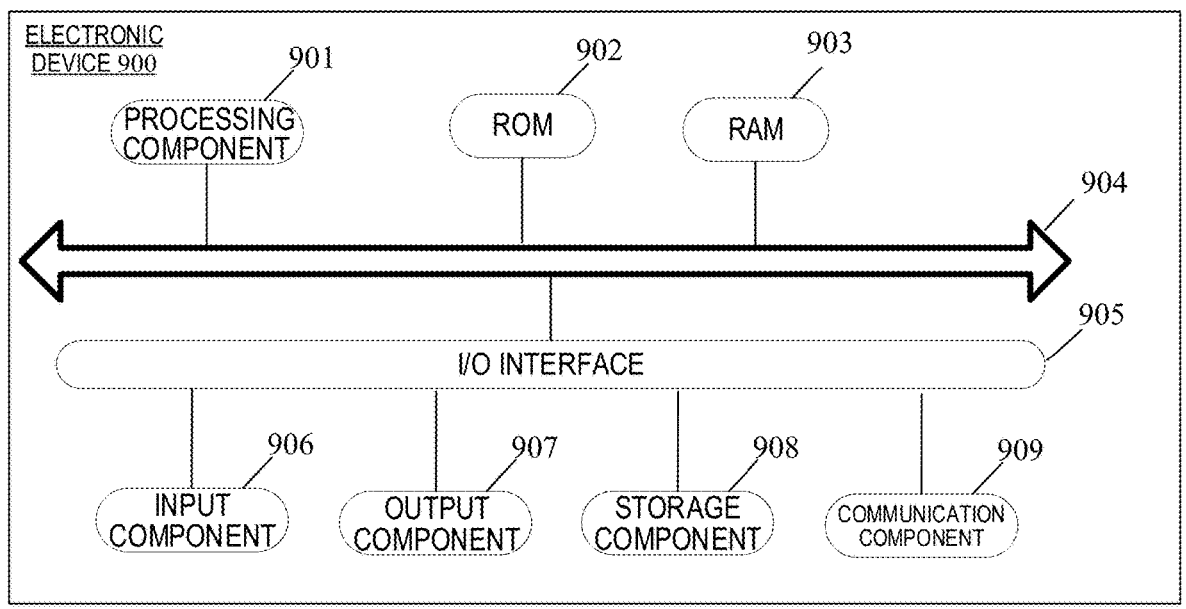
FIG. 12 is a schematic diagram of a hardware structure of an electronic device according to an embodiment of the present disclosure.

Referring to FIG. 12, it shows a schematic structural diagram of an electronic device 900 suitable for implementing an embodiment of the present disclosure, and the electronic device 900 may be a terminal device or a server. The terminal device may include, but is not limited to, a mobile terminal such as a mobile phone, a laptop computer, a digital broadcast receiver, a personal digital assistant (PDA), a portable android device (PAD), a portable multimedia player (PMP), a vehicle-mounted terminal (for example, a vehicle-mounted navigation terminal), and the like, and a fixed terminal such as a digital TV, a desktop computer, and the like. The electronic device shown in FIG. 12 is merely an example and should not bring any limitation to the functions and scope of use of the embodiments of the present disclosure.

As shown in FIG. 12, the electronic device 900 may include processing component (e.g., central processing unit, graphics processing unit, etc.) 901 that may perform various suitable actions and processes in accordance with a program stored in read only memory (ROM) 902 or a program loaded into random access memory (RAM) 903 from storage 908. In the RAM 903, various programs and data necessary for the operation of the electronic device 900 are also stored. The processing component 901, the ROM 902, and the RAM 903 are connected to each other via a bus 904. An input/output (I/O) interface 905 is also connected to the bus 904.

In general, the following components may be connected to the I/O interface 905: an input component 906 including, for example, a touch screen, a touch pad, a keyboard, a mouse, a camera, a microphone, an accelerometer, a gyroscope, or the like; an output component 907 including, for example, a liquid crystal display (LCD), a speaker, a vibrator, or the like; a storage component 908 including, for example, a magnetic tape, a hard disk, or the like; and a communication component 909. The communication component 909 may allow electronic device 900 to communicate wirelessly or wired with other devices to exchange data. While FIG. 12 illustrates an electronic device 900 with a variety of component, it should be understood that it is not required that all of the illustrated components be implemented or provided. More or fewer components may alternatively be implemented or provided.

In particular, the processes described above with reference to the flowcharts may be implemented as computer software programs in accordance with embodiments of the present disclosure. For example, embodiments of the present disclosure include a computer program product comprising a computer program carried on a computer readable medium. The computer program comprises a program code for executing the method as shown in the flowchart. In such an embodiment, the computer program may be downloaded and installed from the network via communications component 909, or installed from storage component 908, or installed from ROM 902. When the computer program is executed by the processing components 901, the above-described functions defined in the method of embodiments of the present disclosure are executed.

It should be noted that the computer readable medium in the present disclosure may be a computer readable signal medium or a computer readable storage medium, or any combination thereof. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain or store a program for use by or in connection with an instruction execution system, apparatus, or device. While in the present disclosure, a computer readable signal medium may include a propagated data signal with computer readable program code embodied therein, for example, in baseband or as part of a carrier wave. Such a propagated signal may take any of a variety of forms, including, but not limited to, electromagnetic signal, optical signal, or any suitable combination thereof. A computer readable signal medium may also be any computer readable medium that is not a computer readable storage medium and that can sent, propagate, or transport a program for use by or in connection with an instruction execution system, apparatus, or device. Program code embodied on a computer readable medium may be transmitted using any appropriate medium, including, but not limited to, wireline, optical fiber cable, RF (radio frequency), etc., or any suitable combination of the foregoing.

The computer readable medium may be included in the electronic device, or may exist separately and not be installed in the electronic device.

The computer readable medium carries one or more programs, and when the one or more programs are executed by the electronic device, the electronic device is enabled to execute the method shown in the foregoing embodiments.

Computer program code for carrying out operations for aspects of the present disclosure may be written in any combination of one or more programming languages, including an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, a program segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart, and combinations of blocks in the block diagrams and/or flowchart, can be implemented by special purpose hardware-based systems that perform the specified functions or acts, or combinations of special purpose hardware and computer instructions.

The units involved in the embodiments of the present disclosure may be implemented through software or hardware. The name of a unit does not constitute a limitation to the unit itself in some cases, for example, the first acquisition unit may also be described as "unit for acquiring at least two internet protocol addresses".

The functions described herein above may be performed, at least in part, by one or more hardware logic components. For example, without limitation, exemplary types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), etc.

In the context of this disclosure, a machine-readable medium may be tangible media that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing.

In a first aspect, according to one or more embodiments of the present disclosure, a method for detecting virtual machine load, comprising:

acquiring a virtual processor thread corresponding to a target virtual machine, wherein the virtual processor thread is an exclusive thread of the target virtual machine; acquiring a first occupation duration of the virtual processor thread in a guest mode within a first detection period, wherein the virtual processor thread in the guest mode is used for executing a task request of the target virtual machine, and the first occupation duration represents a duration in which the virtual processor thread is in a state of executing the task request of the target virtual machine; and obtaining a running load of the target virtual machine according to a proportion of the first occupation duration in the first detection period.

According to one or more embodiments of present disclosure, the acquiring a first occupation duration of the virtual processor thread in a guest mode within a first detection period comprises: after the first detection period is started, acquiring a first state value at a first moment before the virtual processor thread is detected to enter the guest mode, wherein the first state value represents the accumulated number of clock periods of the virtual processor thread in a running state at the first moment; acquiring a second state value at a second moment after the virtual processor thread is detected to exit the guest mode, wherein the second state value represents the accumulated number of clock periods of the virtual processor thread in a running state at the second moment; obtaining, according to a difference between the second state value and the first state value, the first occupation duration of the virtual processor thread in the guest mode within the first detection period.

According to one or more embodiments of present disclosure, the acquiring a first state value at a first moment before the virtual processor thread is detected to enter the guest mode comprises: in response to a first instruction for entering the guest mode is detected, reading a first exclusive register of the virtual processor thread to obtain the first state value, wherein the first exclusive register is used for recording the real-time accumulated number of clock periods of the virtual processor thread in the running state after an operating system is started; the acquiring a second state value at a second moment after the virtual processor thread is detected to exit the guest mode comprises: in response to a second instruction for exiting the guest mode is detected, reading the first exclusive register of the virtual processor thread to obtain the second state value.

According to one or more embodiments of present disclosure, the first exclusive register is an MSR_IA32_MPERF register.

According to one or more embodiments of present disclosure, the obtaining, according to the difference between the second state value and the first state value, the first occupation duration of the virtual processor thread in the guest mode within the first detection period comprises: obtaining a first running duration according to a difference between the second state value and the first state value, and writing the first running duration into a second exclusive register of the virtual processor thread, wherein the second exclusive register is used for accumulating the first running duration to generate a second running duration; after the first detection period ends, reading the second running duration in the second exclusive register, so as to obtain the first occupation duration of the virtual processor thread in the guest mode within the first detection period.

According to one or more embodiments of present disclosure, the method further comprises: reading, at the first moment, a third exclusive register of the virtual processor thread to obtain a first number of clock periods, wherein the third exclusive register is used for recording the real-time cumulated number of clock periods of the virtual processor thread after the operating system is started; reading, at the second moment, the third exclusive register of the virtual processor thread to obtain a second number of clock periods; obtaining an actual detection period based on a difference between the second number of clock periods and the first number of clock periods; the obtaining a running load of the target virtual machine according to the proportion of the first occupation duration in the first detection period comprises: obtaining the running load of the target virtual machine according to a ratio of the first occupation duration to the actual detection period.

According to one or more embodiments of present disclosure, the acquiring a first occupation duration of the virtual processor thread in the guest mode within a first detection period comprises: during the first detection period, obtaining at least two occupation sub-durations, wherein the occupation sub-durations represent durations in which the virtual processor thread is in a state of executing a task request of the target virtual machine during the virtual processor thread being in the guest mode only once; obtaining the occupation duration according to a weighted sum of at least two occupation sub-durations, wherein a weighted coefficient corresponding to the occupation sub-duration is related to the time when the guest mode corresponding to the occupation sub-duration is entered.

According to one or more embodiments of present disclosure, the method further comprises: acquiring a second occupation duration of the virtual processor thread in a host mode within the first detection period, wherein the virtual processor thread in the host mode is used for executing a task request of a physical machine, and the second occupation duration represents a duration in which the virtual processor thread is in a state of executing the task request of the physical machine; obtaining a running load of a virtualization layer corresponding to the target virtual machine according to a proportion of the second occupation duration in the first detection period.

According to one or more embodiments of present disclosure, the acquiring a second occupation duration of the virtual processor thread in the host mode within the first detection period comprises: after the first detection period is started, acquiring a third state value at a third moment after the virtual processor thread is detected to exit the guest mode, wherein the third state value represents the accumulated number of clock periods of the virtual processor thread in a running state at the third moment; acquiring a fourth state value at a fourth moment before the virtual processor thread is detected to enter the guest mode, wherein the fourth state value represents the accumulated number of clock periods of the virtual processor thread in a running state at the fourth moment; obtaining, according to a difference between the fourth state value and the third state value, the second occupation duration of the virtual processor thread in the host mode within the first detection period.

In a second aspect, according to one ore more embodiments of present disclosure, an apparatus for detecting virtual machine load is provided, comprising:
  an acquiring module configured to acquire a virtual processor thread corresponding to a target virtual machine, wherein the virtual processor thread is an exclusive thread of the target virtual machine;
  a processing module configured to acquire a first occupation duration of the virtual processor thread in a guest mode within a first detection period, wherein the virtual processor thread in the guest mode is used for executing a task request of the target virtual machine, and the first occupation duration represents a duration in which the virtual processor thread is in a state of executing the task request of the target virtual machine; and a detecting module configured to obtain a running load of the target virtual machine according to a proportion of the first occupation duration in the first detection period.

According to one or more embodiment of the present disclosure, the processing module is specifically used for: after the first detection period is started, acquiring a first state value at a first moment before the virtual processor thread is detected to enter the guest mode, wherein the first state value represents the accumulated number of clock periods of the virtual processor thread in a running state at the first moment; acquiring a second state value at a second moment after the virtual processor thread is detected to exit the guest mode, wherein the second state value represents the accumulated number of clock periods of the virtual processor thread in a running state at the second moment; obtaining, according to a difference between the second state value and the first state value, the first occupation duration of the virtual processor thread in the guest mode within the first detection period.

According to one or more embodiment of the present disclosure, when acquiring a first state value at a first moment before the virtual processor thread is detected to enter the guest mode, the processing module is specifically used for: in response to a first instruction for entering the guest mode is detected, reading a first exclusive register of the virtual processor thread to obtain the first state value, wherein the first exclusive register is used for recording the real-time accumulated number of clock periods of the virtual processor thread in the running state after an operating system is started; when acquiring a second state value at a second moment after the virtual processor thread is detected to exit the guest mode, the processing module is specifically used for: in response to a second instruction for exiting the guest mode is detected, reading the first exclusive register of the virtual processor thread to obtain the second state value.

According to one or more embodiment of the present disclosure, the first exclusive register is an MSR_IA32_MPERF register.

According to one or more embodiment of the present disclosure, when obtaining, according to the difference between the second state value and the first state value, the first occupation duration of the virtual processor thread in the guest mode within the first detection period, the processing module is specifically used for: obtaining a first running duration according to a difference between the second state value and the first state value, and writing the first running duration into a second exclusive register of the virtual processor thread, wherein the second exclusive register is used for accumulating the first running duration to generate a second running duration; after the first detection period ends, reading the second running duration in the second exclusive register, so as to obtain the first occupation duration of the virtual processor thread in the guest mode within the first detection period.

According to one or more embodiment of the present disclosure, the processing module is used for: reading, at the first moment, a third exclusive register of the virtual processor thread to obtain a first number of clock periods, wherein the third exclusive register is used for recording the real-time cumulated number of clock periods of the virtual processor thread after the operating system is started; reading, at the second moment, the third exclusive register of the virtual processor thread to obtain a second number of clock periods; obtaining an actual detection period based on a difference between the second number of clock periods and the first number of clock periods; a detecting module is specifically used for: obtaining the running load of the target virtual machine according to a ratio of the first occupation duration to the actual detection period.

According to one or more embodiment of the present disclosure, the processing module is specifically used for: during the first detection period, obtaining at least two occupation sub-durations, wherein the occupation sub-durations represent durations in which the virtual processor thread is in a state of executing a task request of the target virtual machine during the virtual processor thread being in the guest mode only once; obtaining the occupation duration according to a weighted sum of at least two occupation sub-durations, wherein a weighted coefficient corresponding to the occupation sub-duration is related to the time when the guest mode corresponding to the occupation sub-duration is entered.

According to one or more embodiment of the present disclosure, the processing modules is used for: acquiring a second occupation duration of the virtual processor thread in a host mode within the first detection period, wherein the virtual processor thread in the host mode is used for executing a task request of a physical machine, and the second occupation duration represents a duration in which the virtual processor thread is in a state of executing the task request of the physical machine; a detecting module is used for: obtaining a running load of a virtualization layer corresponding to the target virtual machine according to a proportion of the second occupation duration in the first detection period.

According to one or more embodiment of the present disclosure, when acquiring a second occupation duration of the virtual processor thread in the host mode within the first detection period, the processing module is specifically used for: after the first detection period is started, acquiring a third state value at a third moment after the virtual processor thread is detected to exit the guest mode, wherein the third state value represents the accumulated number of clock periods of the virtual processor thread in a running state at the third moment; acquiring a fourth state value at a fourth moment before the virtual processor thread is detected to enter the guest mode, wherein the fourth state value represents the accumulated number of clock periods of the virtual processor thread in a running state at the fourth moment; obtaining, according to a difference between the fourth state value and the third state value, the second occupation duration of the virtual processor thread in the host mode within the first detection period.

In the third aspect, according to one or more embodiment of the present disclosure, an electronic device is provided, comprising: a processor, and a memory communicatively connected with the processor;
the memory stores a computer execution instruction;
the processor executes the computer execution instruction stored in the memory, to implement the method for detecting virtual machine load of the first aspect and various possible designs of the first aspect.

In a fourth aspect, according to one or more embodiment of the present disclosure, a computer readable storage medium is provided, the computer readable storage medium stores a computer execution instruction, the computer execution instruction, when executed by a processor, implementing the method for detecting virtual machine load of the first aspect and various possible designs of the first aspect.

In a fifth aspect, the embodiments of present disclosure provide a computer program product, comprising a computer program, the computer program, when executed by a processor, implementing the method for detecting virtual machine load of the first aspect and various possible designs of the first aspect.

The foregoing description is merely illustrative of the preferred embodiments of the present disclosure and of the technical principles applied thereto. As will be appreciated by those skilled in the art, the disclosure of the present disclosure is not limited to the technical solution formed by the specific combination of the described technical features, it should also cover other technical solutions formed by any combination of the described technical features or equivalent features thereof without departing from the described disclosed concept. For example, the above features and technical features having similar functions disclosed in the present disclosure (but not limited thereto) are replaced with each other to form a technical solution.

In addition, while operations are depicted in a particular order, this should not be understood as requiring that the operations be performed in the particular order shown or in sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

What is claimed is:

1. A method for detecting virtual machine load, comprising:
    acquiring a virtual processor thread corresponding to a target virtual machine, wherein the virtual processor thread is an exclusive thread of the target virtual machine;
    acquiring a first occupation duration of the virtual processor thread in a guest mode within a first detection period, wherein the virtual processor thread in the guest mode is used for executing a task request of the target virtual machine, and the first occupation duration represents a duration in which the virtual processor thread is in a state of executing the task request of the target virtual machine; and
    obtaining a running load of the target virtual machine according to a proportion of the first occupation duration in the first detection period.

2. The method of claim 1, wherein the acquiring a first occupation duration of the virtual processor thread in a guest mode within a first detection period comprises:
    after the first detection period is started, acquiring a first state value at a first moment before the virtual processor thread is detected to enter the guest mode, wherein the first state value represents the accumulated number of clock periods of the virtual processor thread in a running state at the first moment;
    acquiring a second state value at a second moment after the virtual processor thread is detected to exit the guest mode, wherein the second state value represents the accumulated number of clock periods of the virtual processor thread in a running state at the second moment; and
    obtaining, according to a difference between the second state value and the first state value, the first occupation duration of the virtual processor thread in the guest mode within the first detection period.

3. The method of claim 2, wherein the acquiring a first state value at a first moment before the virtual processor thread is detected to enter the guest mode comprises:
    in response to a first instruction for entering the guest mode being detected, reading a first exclusive register of the virtual processor thread to obtain the first state value, wherein the first exclusive register is used for recording the real-time accumulated number of clock periods of the virtual processor thread in the running state after an operating system is started; and
    wherein the acquiring a second state value at a second moment after the virtual processor thread is detected to exit the guest mode comprises:
    in response to a second instruction for exiting the guest mode is detected, reading the first exclusive register of the virtual processor thread to obtain the second state value.

4. The method of claim 3, wherein the first exclusive register is an MSR_IA32_MPERF register.

5. The method of claim 2, wherein the obtaining, according to the difference between the second state value and the first state value, the first occupation duration of the virtual processor thread in the guest mode within the first detection period comprises:
    obtaining a first running duration according to the difference between the second state value and the first state value, and writing the first running duration into a second exclusive register of the virtual processor thread, wherein the second exclusive register is used for accumulating the first running duration to generate a second running duration; and
    after the first detection period ends, reading the second running duration in the second exclusive register, to obtain the first occupation duration of the virtual processor thread in the guest mode within the first detection period.

6. The method of claim 2, further comprising:
    reading, at the first moment, a third exclusive register of the virtual processor thread to obtain a first number of clock periods, wherein the third exclusive register is used for recording the real-time cumulated number of clock periods of the virtual processor thread after the operating system is started;
    reading, at the second moment, the third exclusive register of the virtual processor thread to obtain a second number of clock periods; and
    obtaining an actual detection period based on a difference between the second number of clock periods and the first number of clock periods;
    wherein the obtaining a running load of the target virtual machine according to the proportion of the first occupation duration in the first detection period comprises:
    obtaining the running load of the target virtual machine according to a ratio of the first occupation duration to the actual detection period.

7. The method of claim 1, wherein the acquiring a first occupation duration of the virtual processor thread in the guest mode within a first detection period comprises:
    during the first detection period, obtaining at least two occupation sub-durations, wherein the occupation sub-durations represent durations in which the virtual processor thread is in a state of executing a task request of the target virtual machine during the virtual processor thread being in the guest mode only once; and obtaining the occupation duration according to a weighted sum of the at least two occupation sub-durations, wherein a weighted coefficient corresponding to the occupation sub-duration is related to the time when the guest mode corresponding to the occupation sub-duration is entered.

8. The method of claim 1, further comprising:

acquiring a second occupation duration of the virtual processor thread in a host mode within the first detection period, wherein the virtual processor thread in the host mode is used for executing a task request of a physical machine, and the second occupation duration represents a duration in which the virtual processor thread is in a state of executing the task request of the physical machine; and obtaining a running load of a virtualization layer corresponding to the target virtual machine according to a proportion of the second occupation duration in the first detection period.

9. The method of claim 8, wherein the acquiring a second occupation duration of the virtual processor thread in the host mode within the first detection period comprises:

after the first detection period is started, acquiring a third state value at a third moment after the virtual processor thread is detected to exit the guest mode, wherein the third state value represents the accumulated number of clock periods of the virtual processor thread in a running state at the third moment;

acquiring a fourth state value at a fourth moment before the virtual processor thread is detected to enter the guest mode, wherein the fourth state value represents the accumulated number of clock periods of the virtual processor thread in a running state at the fourth moment; and obtaining, according to a difference between the fourth state value and the third state value, the second occupation duration of the virtual processor thread in the host mode within the first detection period.

10. An electronic device, comprising: a processor, and a memory communicatively connected with the processor;

the memory storing a computer execution instruction; and the processor executing the computer executable instruction stored in the memory, to implement acts comprising:

acquiring a virtual processor thread corresponding to a target virtual machine, wherein the virtual processor thread is an exclusive thread of the target virtual machine;

acquiring a first occupation duration of the virtual processor thread in a guest mode within a first detection period, wherein the virtual processor thread in the guest mode is used for executing a task request of the target virtual machine, and the first occupation duration represents a duration in which the virtual processor thread is in a state of executing the task request of the target virtual machine; and obtaining a running load of the target virtual machine according to a proportion of the first occupation duration in the first detection period.

11. The electronic device of claim 10, wherein the acquiring a first occupation duration of the virtual processor thread in a guest mode within a first detection period comprises:

after the first detection period is started, acquiring a first state value at a first moment before the virtual processor thread is detected to enter the guest mode, wherein the first state value represents the accumulated number of clock periods of the virtual processor thread in a running state at the first moment;

acquiring a second state value at a second moment after the virtual processor thread is detected to exit the guest mode, wherein the second state value represents the accumulated number of clock periods of the virtual processor thread in a running state at the second moment; and obtaining, according to a difference between the second state value and the first state value, the first occupation duration of the virtual processor thread in the guest mode within the first detection period.

12. The electronic device of claim 11, wherein the acquiring a first state value at a first moment before the virtual processor thread is detected to enter the guest mode comprises:

in response to a first instruction for entering the guest mode being detected, reading a first exclusive register of the virtual processor thread to obtain the first state value, wherein the first exclusive register is used for recording the real-time accumulated number of clock periods of the virtual processor thread in the running state after an operating system is started; and wherein the acquiring a second state value at a second moment after the virtual processor thread is detected to exit the guest mode comprises:

in response to a second instruction for exiting the guest mode is detected, reading the first exclusive register of the virtual processor thread to obtain the second state value.

13. The electronic device of claim 12, wherein the first exclusive register is an MSR_IA32_MPERF register.

14. The electronic device of claim 11, wherein the obtaining, according to the difference between the second state value and the first state value, the first occupation duration of the virtual processor thread in the guest mode within the first detection period comprises:

obtaining a first running duration according to the difference between the second state value and the first state value, and writing the first running duration into a second exclusive register of the virtual processor thread, wherein the second exclusive register is used for accumulating the first running duration to generate a second running duration; and after the first detection period ends, reading the second running duration in the second exclusive register, to obtain the first occupation duration of the virtual processor thread in the guest mode within the first detection period.

15. The electronic device of claim 11, further comprising:

reading, at the first moment, a third exclusive register of the virtual processor thread to obtain a first number of clock periods, wherein the third exclusive register is used for recording the real-time cumulated number of clock periods of the virtual processor thread after the operating system is started;

reading, at the second moment, the third exclusive register of the virtual processor thread to obtain a second number of clock periods; and obtaining an actual detection period based on a difference between the second number of clock periods and the first number of clock periods;

wherein the obtaining a running load of the target virtual machine according to the proportion of the first occupation duration in the first detection period comprises:
obtaining the running load of the target virtual machine according to a ratio of the first occupation duration to the actual detection period.

16. The electronic device of claim 10, wherein the acquiring a first occupation duration of the virtual processor thread in the guest mode within a first detection period comprises:
during the first detection period, obtaining at least two occupation sub-durations, wherein the occupation sub-durations represent durations in which the virtual processor thread is in a state of executing a task request of the target virtual machine during the virtual processor thread being in the guest mode only once; and
obtaining the occupation duration according to a weighted sum of the at least two occupation sub-durations, wherein a weighted coefficient corresponding to the occupation sub-duration is related to the time when the guest mode corresponding to the occupation sub-duration is entered.

17. The electronic device of claim 10, further comprising:
acquiring a second occupation duration of the virtual processor thread in a host mode within the first detection period, wherein the virtual processor thread in the host mode is used for executing a task request of a physical machine, and the second occupation duration represents a duration in which the virtual processor thread is in a state of executing the task request of the physical machine; and
obtaining a running load of a virtualization layer corresponding to the target virtual machine according to a proportion of the second occupation duration in the first detection period.

18. The electronic device of claim 17, wherein the acquiring a second occupation duration of the virtual processor thread in the host mode within the first detection period comprises:
after the first detection period is started, acquiring a third state value at a third moment after the virtual processor thread is detected to exit the guest mode, wherein the third state value represents the accumulated number of clock periods of the virtual processor thread in a running state at the third moment;
acquiring a fourth state value at a fourth moment before the virtual processor thread is detected to enter the guest mode, wherein the fourth state value represents the accumulated number of clock periods of the virtual processor thread in a running state at the fourth moment; and
obtaining, according to a difference between the fourth state value and the third state value, the second occupation duration of the virtual processor thread in the host mode within the first detection period.

19. A non-transitory computer readable storage medium, wherein the computer readable storage medium stores a computer executable instruction, the computer executable instruction, when executed by a processor, implementing the method comprising:
acquiring a virtual processor thread corresponding to a target virtual machine, wherein the virtual processor thread is an exclusive thread of the target virtual machine;
acquiring a first occupation duration of the virtual processor thread in a guest mode within a first detection period, wherein the virtual processor thread in the guest mode is used for executing a task request of the target virtual machine, and the first occupation duration represents a duration in which the virtual processor thread is in a state of executing the task request of the target virtual machine; and
obtaining a running load of the target virtual machine according to a proportion of the first occupation duration in the first detection period.

20. The non-transitory computer readable storage medium of claim 19, wherein the acquiring a first occupation duration of the virtual processor thread in a guest mode within a first detection period comprises:
after the first detection period is started, acquiring a first state value at a first moment before the virtual processor thread is detected to enter the guest mode, wherein the first state value represents the accumulated number of clock periods of the virtual processor thread in a running state at the first moment;
acquiring a second state value at a second moment after the virtual processor thread is detected to exit the guest mode, wherein the second state value represents the accumulated number of clock periods of the virtual processor thread in a running state at the second moment; and
obtaining, according to a difference between the second state value and the first state value, the first occupation duration of the virtual processor thread in the guest mode within the first detection period.

* * * * *